(12) United States Patent
Newman et al.

(10) Patent No.: US 11,238,084 B1
(45) Date of Patent: *Feb. 1, 2022

(54) SEMANTIC TRANSLATION OF DATA SETS

(71) Applicant: Wells Fargo Bank, N.A., San Francisco, CA (US)

(72) Inventors: David Newman, Walnut Creek, CA (US); Omar B. Khan, Richmond, VA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,574

(22) Filed: Jul. 10, 2017

Related U.S. Application Data (60) Provisional application No. 62/441,079, filed on Dec. 30, 2016.

(51) Int. Cl.
*G06F 16/36* (2019.01)
*G06F 16/28* (2019.01)
*G06F 16/33* (2019.01)

(52) U.S. Cl.
CPC .......... *G06F 16/367* (2019.01); *G06F 16/284* (2019.01); *G06F 16/334* (2019.01)

(58) Field of Classification Search
CPC ..... G06F 16/367; G06F 16/334; G06F 16/284
See application file for complete search history.

(56) References Cited

U.S. PATENT DOCUMENTS

| | | |
|---|---|---|
| 8,793,198 B1 | 7/2014 | Thomas |
| 9,196,007 B1 | 11/2015 | Thomas |
| 10,489,419 B1 | 11/2019 | Newman et al. |
| 2002/0022956 A1 | 2/2002 | Ukrainczyk et al. |
| 2003/0078825 A1 | 4/2003 | Cope |
| 2004/0095380 A1 | 5/2004 | Bass et al. |
| 2006/0206883 A1 | 9/2006 | Sabbouh |
| 2007/0079236 A1 | 4/2007 | Schrier et al. |
| 2007/0260591 A1 | 11/2007 | Ahi |
| 2008/0270458 A1 | 10/2008 | Gvelesiani |
| 2009/0106234 A1 | 4/2009 | Siedlecki et al. |
| 2010/0185637 A1* | 7/2010 | Morris .............. G06F 16/24556 707/758 |

(Continued)

OTHER PUBLICATIONS

Mapping Hierarchical Sources into RDF using the RML Mapping Language, Anastasia Dimou, IEEE, pp. 151-158 (Year: 2014).*

(Continued)

*Primary Examiner* — Mariela Reyes
*Assistant Examiner* — Fatima P Mina
(74) *Attorney, Agent, or Firm* — Schwegman Lundberg & Woessner, P.A.

(57) ABSTRACT

A method may include accessing a semantic map between a schema of a relational database (RDB) and a resource description framework (RDF) data model, the semantic map defined according to a first semantic ontology; applying the semantic map to data loaded from the RDB to generate a first set of semantic objects; storing the first set of semantic objects in a staging RDF triplestore; executing a script to transform the first set of semantic objects into a second set of semantic objects according to a second semantic ontology; and storing the second set of semantic objects into a production RDF triplestore.

14 Claims, 8 Drawing Sheets

(56) References Cited

U.S. PATENT DOCUMENTS

| | | | |
|---|---|---|---|
| 2012/0023055 A1* | 1/2012 | Dagaeff | H04N 21/235 706/47 |
| 2012/0131189 A1 | 5/2012 | Smart et al. | |
| 2012/0303611 A1* | 11/2012 | Kusumura | G06F 16/355 707/722 |
| 2012/0323741 A1* | 12/2012 | Rangachari | G06Q 30/0601 705/27.1 |
| 2013/0054621 A1 | 2/2013 | Kretz et al. | |
| 2013/0080461 A1 | 3/2013 | Byrne et al. | |
| 2013/0262501 A1 | 10/2013 | Kuchmann-Beauger et al. | |
| 2013/0290226 A1 | 10/2013 | Dokken | |
| 2014/0018034 A1 | 1/2014 | Lindberg | |
| 2014/0025643 A1* | 1/2014 | Baldwin | G06F 16/2365 707/690 |
| 2014/0040275 A1 | 2/2014 | Dang et al. | |
| 2014/0156638 A1* | 6/2014 | Joshi | G06F 16/254 707/722 |
| 2014/0236579 A1 | 8/2014 | Kurz | |
| 2015/0012561 A1* | 1/2015 | Kirchoff | G06F 16/258 707/769 |
| 2015/0127632 A1 | 5/2015 | Khaitan et al. | |
| 2015/0178853 A1 | 6/2015 | Byron et al. | |
| 2015/0332670 A1 | 11/2015 | Akbacak et al. | |
| 2015/0347533 A1 | 12/2015 | Shakirzianov et al. | |
| 2016/0078016 A1 | 3/2016 | Ng Tari et al. | |
| 2016/0110389 A1 | 4/2016 | Oltman et al. | |
| 2016/0196360 A1 | 7/2016 | Best et al. | |
| 2017/0024657 A1 | 1/2017 | Sahu et al. | |
| 2017/0061001 A1 | 3/2017 | Tonkin et al. | |
| 2017/0083547 A1* | 3/2017 | Tonkin | G06F 16/367 |
| 2017/0177642 A1* | 6/2017 | Burger | G06F 16/2282 |
| 2017/0185674 A1* | 6/2017 | Tonkin | G06F 16/328 |

OTHER PUBLICATIONS

Souripriya Das "R2RML: RDB to RDF Mapping Language"; p. 1-35. (Year: 2012).*

"U.S. Appl. No. 15/645,582, Response filed Jul. 5, 2019 to Non-Final Office Action dated Apr. 5, 2019", 9 pgs.

"U.S. Appl. No. 15/471,728, Non Final Office Action dated Feb. 7, 2019", 9 pgs.

"U.S. Appl. No. 15/471,728, Response filed May 7, 2019 to Non Final Office Action dated Feb. 7, 2019", 9 pgs.

"U.S. Appl. No. 15/645,582, Non Final Office Action dated Apr. 5, 2019", 11 pgs.

Dimou, Anastasia, et al., "Mapping Hierarchical Sources into RDF using the RML Mapping Language", (May 20, 2015), 8 pgs.

"U.S. Appl. No. 15/645,582, Non Final Office Action dated Jul. 13, 2020".

"U.S. Appl. No. 15/645,582, Response filed Aug. 31, 2020 to Non Final Office Action dated Jul. 13, 2020", 13 pgs.

"U.S. Appl. No. 15/471,723, Notice of Allowance dated Jul. 18, 2019", 7 pgs.

"U.S. Appl. No. 15/645,582, Final Office Action dated Oct. 3, 2019", 12 pgs.

"U.S. Appl. No. 15/645,582, Response filed Jan. 2, 2020 to Final Office Action dated Oct. 3, 2019", 19 pgs.

"U.S. Appl. No. 15/645,582, Final Office Action dated Dec. 7, 2020".

"U.S. Appl. No. 15/645,582, Response filed Feb. 8, 2021 to Final Office Action dated Dec. 7, 2020", 17 pgs.

"Application Serial No. 15/645,582, Advisory Action dated Feb. 17, 2021", 3 pgs.

"U.S. Appl. No. 15/645,582, Non Final Office Action dated Apr. 14, 2021", 24 pgs.

U.S. Appl. No. 16/694,181, filed Nov. 25, 2019, Data Modeling Translation System.

"U.S. Appl. No. 15/645,582, Response filed Jul. 14, 2021 to Non Final Office Action dated Apr. 14, 2021".

* cited by examiner

SEMANTIC TRANSLATION OF DATA SETS

CROSS-REFERENCE TO RELATED-APPLICATIONS

This patent application claims the benefit of U.S. Provisional Patent Application No. 62/441,079, filed Dec. 30, 2016, entitled "SEMANTIC TRANSLATION OF DATA SETS", which is incorporated by reference herein in its entirety.

This patent application relates to U.S. patent application Ser. No. 14/933,630, filed Nov. 5, 2015, titled "Semantic Processing of Customer Communications"; U.S. Patent Application No. 62/314,338, filed Mar. 28, 2016; and U.S. Patent Application No. 62/360,890, filed Jul. 11, 2016, each of which are hereby incorporated in their entirety.

TECHNICAL FIELD

Embodiments described herein generally relate to data structure manipulation and in particular, but without limitation, to semantic translation of data sets.

BACKGROUND

Data may be stored in a variety of database paradigms. For example, a relational database may include one or more tables that are linked using a primary key (e.g., a column). A flat file database may be a character delineated file without explicit relationship links. Different management systems may be used to extract, transform, and load data (ETL) into a database. For example, a relational database management system may use structured query language (SQL) statements to retrieve data from the database.

Another type of database, a graph database may be used for related data. Nodes of the database may represent objects, edges may connect the nodes to indicate a relationship, and properties may indicate information about the edges and nodes. A triplestore (sometimes referred to a resource description framework (RDF) store) is a type of graph database often used for semantic data that conforms to the subject-predicate (or property)-object format.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 7 illustrates a flowchart of operations for translating semantic objects between triplestores; and in which

DETAILED DESCRIPTION

Many businesses store data in a relational database (RDB). RDBs may include a number of tables that store data relevant to a business. For example, a customer table may include columns for a unique customer identifier, customer name, customer address, etc. Another table may be for customer orders. This table, however, may forgo a column for customer name and instead use the customer identifier. This type of split between tables often reduces storage requirements and increases search efficiency. A "join" query may be used to retrieve all orders for a customer based on the customer identifier along with the address and name for the customer.

Relational databases are queried using structured query language (SQL) statements. The SQL statements, however, use a syntax based on column names and table names to retrieve the requested data. Consequently, there is no inherent semantic context to a search. For example, the customer identification column may be labeled "ID" or may be labeled "key." In other words, a query may not simply be made that reads, "show me all customer orders." Furthermore, even if a person knows the names of the columns and tables, the retrieved data may still be less than useful without a map indicating what the retrieved data represents—e.g., the customer ordered part number 632, but no label is given to the part number. This is in part, because there may not be an agreed-upon semantic vocabulary when using a relational database.

An ontology may be used to help alleviate some of the problems with relational database. However, an ontology in it of itself, may not permit efficient semantic searching of a relational database. A different type of database, such as a triplestore, may be used in conjunction with an ontology to permit semantic searching and storing of data. This disclosure describes various techniques to translate data from a relational database to a semantic database, such as a triplestore.

An ontology may be as a taxonomy of objects for a given field-different fields may use different ontologies. The ontology may identify types (e.g., objects), properties, and inter-relationships between the objects. In some examples, the definition of an ontology is described and stored as a schema at a network-accessible uniform resource identifier (URI).

As a simple example, consider a schema for a Person object. The schema may include a number of entries that define the properties of a Person object such as "given name," "height," "weight," etc., and the properties may also have expected types. Thus, the "height" property may have a quantitative type whereas "given name" may be text. The expected type of an object may be another object such as a property of "knows" having an expected type of Person. Accordingly, the data string "Alice knows Bob" can be thought of as two Person objects with the Alice having the "knows" property.

Another way to consider ontologies is using a "Subject, Predicate, Object" (S-P-O) format. Using the example of "Alice knows Bob," Alice is the subject, the predicate is "knows," and the object is "Bob." With reference back to our example Person schema, the predicate is the property in the schema and the expected type is the object. In other words, a schema may semantically define valid relationships between multiple objects.

Figure 1:
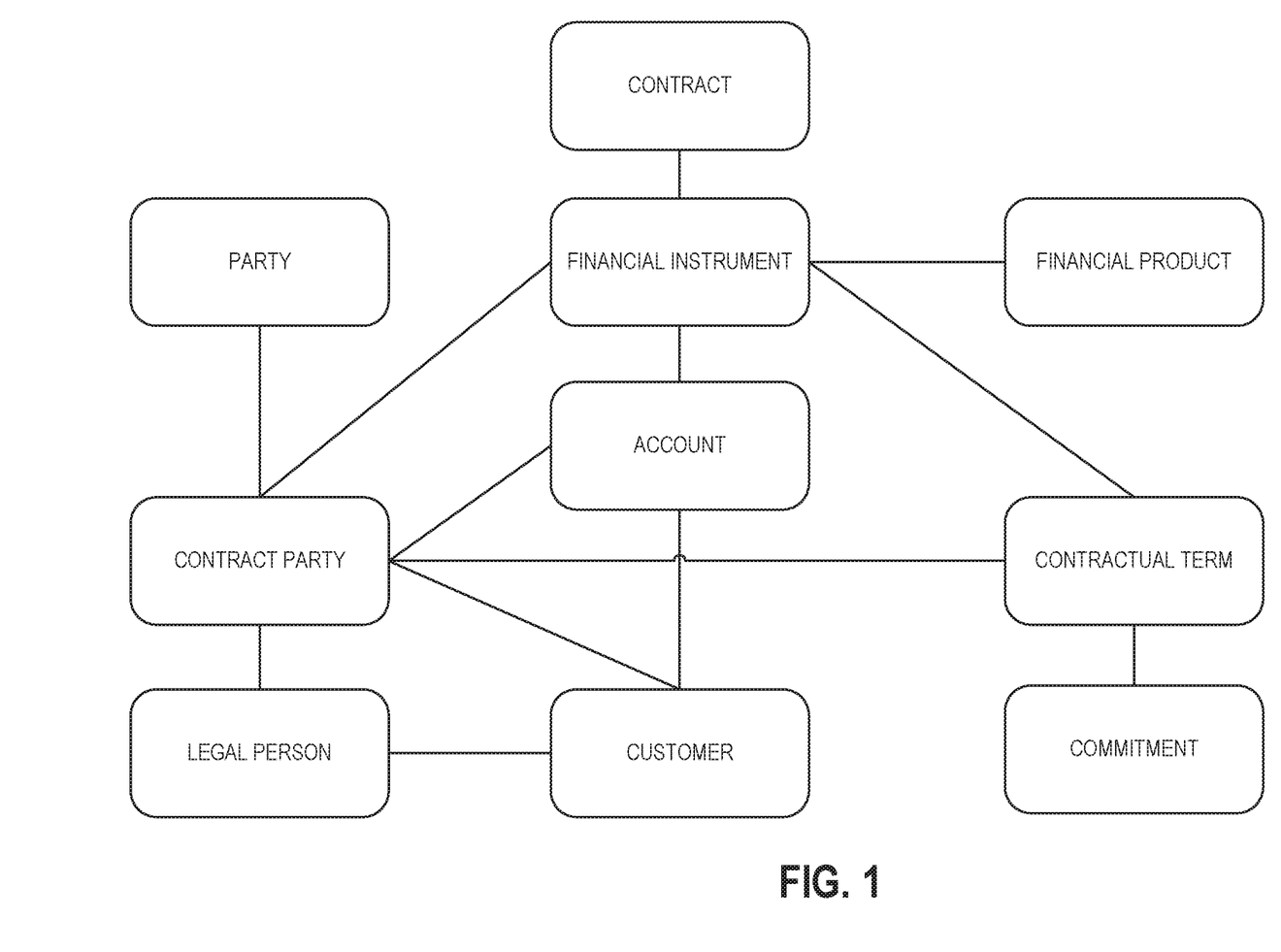
FIG. 1 is a diagram depicting relationships between objects that may be in a contract, according to various examples.

As another example, consider FIG. 1 depicting relationships between objects that may be in a contract. Industry groups may promulgate schemas/ontologies for use by their members or for communicating with their members. For example, the Financial Industry Business Ontology (FIBO™) identifies numerous objects and their semantically defined relationships common in the financial industry-such as depicted in FIG. 1.

Figure 2:
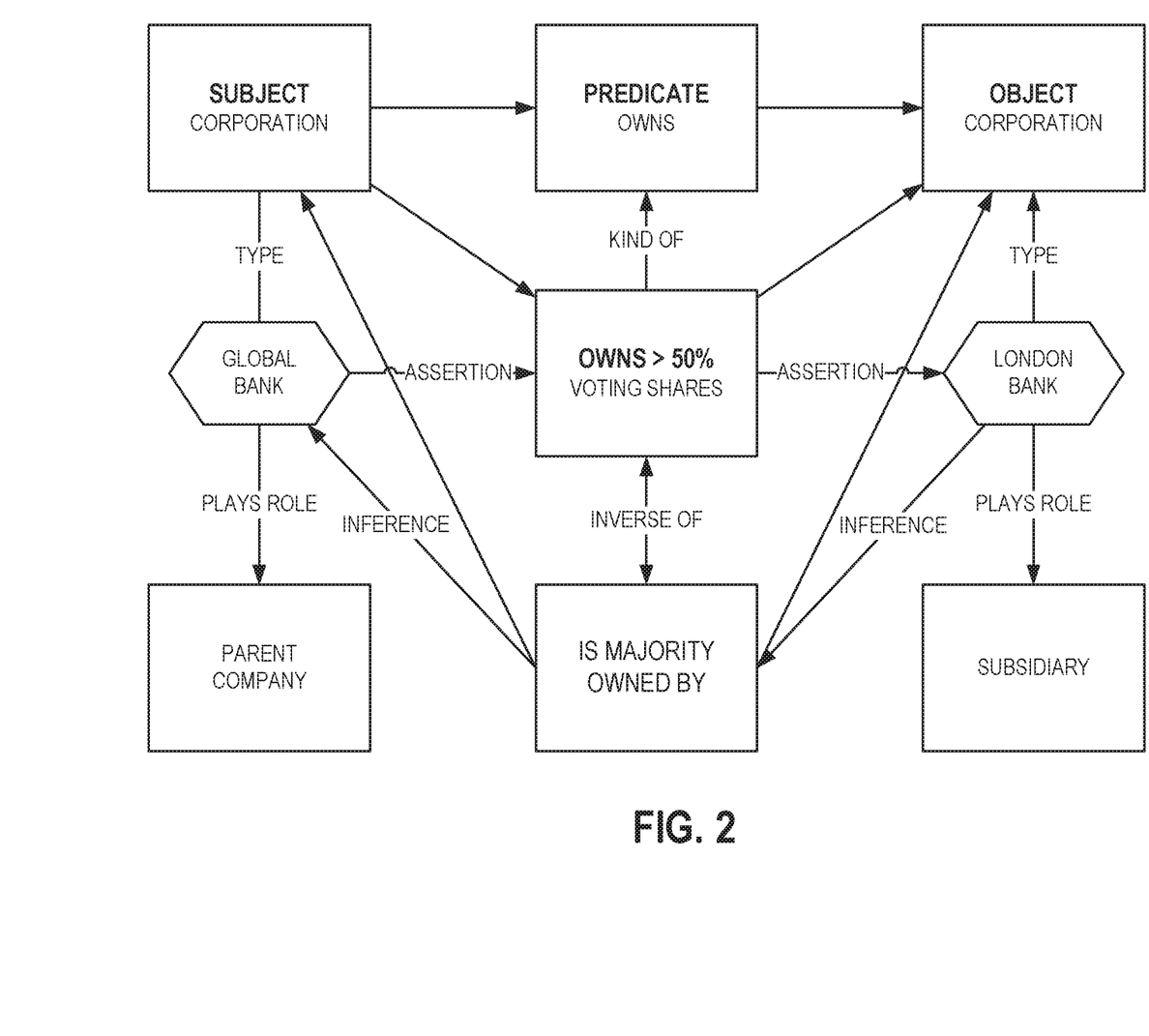
FIG. 2 is an illustration of an ontology, according to various examples.

FIG. 2 illustrates the concept of "Corporate Ownership" as used in a semantic ontology, according to an example. The example uses the S-P-O format discussed above. One flexibility of a semantic ontology is that data from any number of sources may be standardized and harmonized. Accordingly, once a data store (e.g., file system, relational database, NoSQL database, flat file database) is populated with enough semantically intact data, the data may be mined, stored, queried, audited, and validated. The data may originate in a number of forms such as unstructured data, a spreadsheet, a relational database, Extensible Markup Language (XML), JavaScript Object Notation, etc.

In some examples, a specific database, known as a triple-store (also sometimes referred to a resource description framework (RDF) database)), is used to store semantic data. Triples may be expressed using the World Wide Web Consortium's (W3C) RDF protocol. The W3C provides a Web Ontology Language (OWL) semantic web language. RDF/OWL ontologies may be used to associate a most likely terminology with parsed S-P-O communication in order to classify and type terms to a proper semantic meaning. Once a basic term is associated with an element defined in an ontology, the term automatically inherits classes or abstractions that have been predefined in the ontology, which may introduce an additional meaning and context for the term.

Using a triplestore may permit customer knowledge graphs (CKGs) to be visualized by customer service representatives (among others). The visualization may permit the customer service representative to quickly determine a customer's situation without requiring multiple lookups in relational databases or tree-structures.

Figure 3:
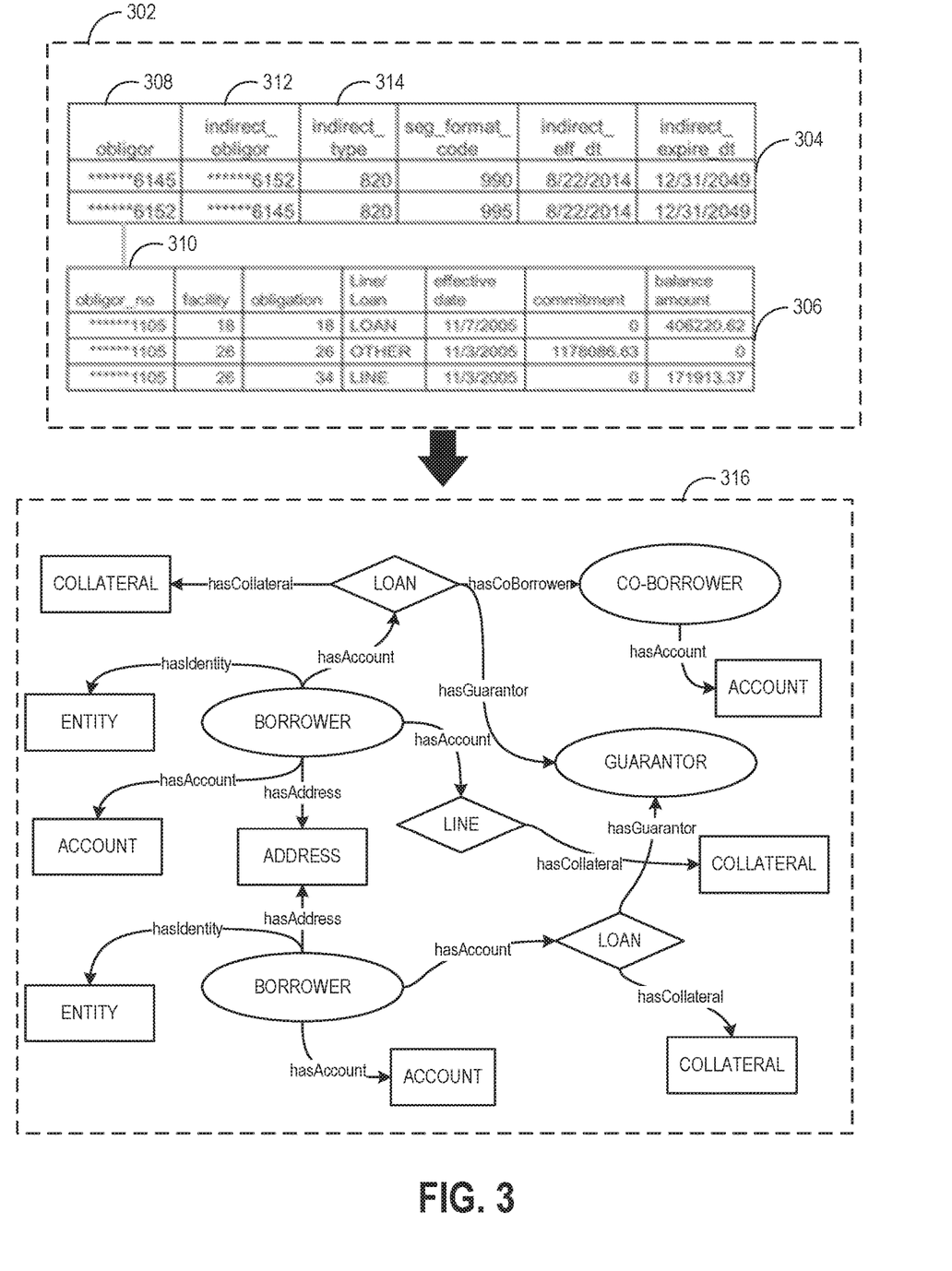
FIG. 3 illustrates an overview of a relational database table compared to an ontology relationship, according to various examples.

FIG. 3 illustrates an overview of a relational database table compared to an ontology relationship, according to various examples. The figure illustrates database 302 that includes table 304 and table 306. These tables in turn include various columns 308-314. Also illustrated is ontology visualization 316.

By way of an ongoing example, consider that the information stored in database 302 is financial data associated with loans and borrowers. The names of the columns and organization of the tables is illustrative and other organizations and labels may be used. It is hard to figure out much information by just looking at these tables. For example, there are obligors and indirect obligors that have indirect types. However, table 304 provides no indication of what indirect type 820 actually is. Consequently, although the information the tables is technically correct and may be queried as such, it is not semantically useful. Similarly, if a graph of the information contained in table 304 and table 306 was presented, the information would still be incomprehensible because one may not know what type 820 represented.

In contrast to the nature of information in a table format such as in database 302, ontology visualization 316 presents information in a more digestible format. The information contained in ontology visualization 316 is arranged around objects (e.g., borrowers, loans, guarantors, etc.) and not column labels.

Additionally, the relationships between data in tables 304 and 306 may make sense for a database schema. These relationships may not directly translate to a semantic ontology (as discussed further below). For example, column 308 may be a primary key for table 304. Accordingly, the information in table 304 may not be organized according to a loan number or identification. This means, that even if the two obligors in column 308 are actually on the same loan, the information is not stored that way. In fact, one can see that obligor 6145 is the indirect obligor for obligor 6152, and vice versa. Accordingly, if the semantic ontology uses a loan as a base object (an example of which is presented in FIG. 4), information in database 302 may not simply be queried and loaded into triplestore because the relationships in the database are different than the relationships in the semantic ontology.

Figure 4:
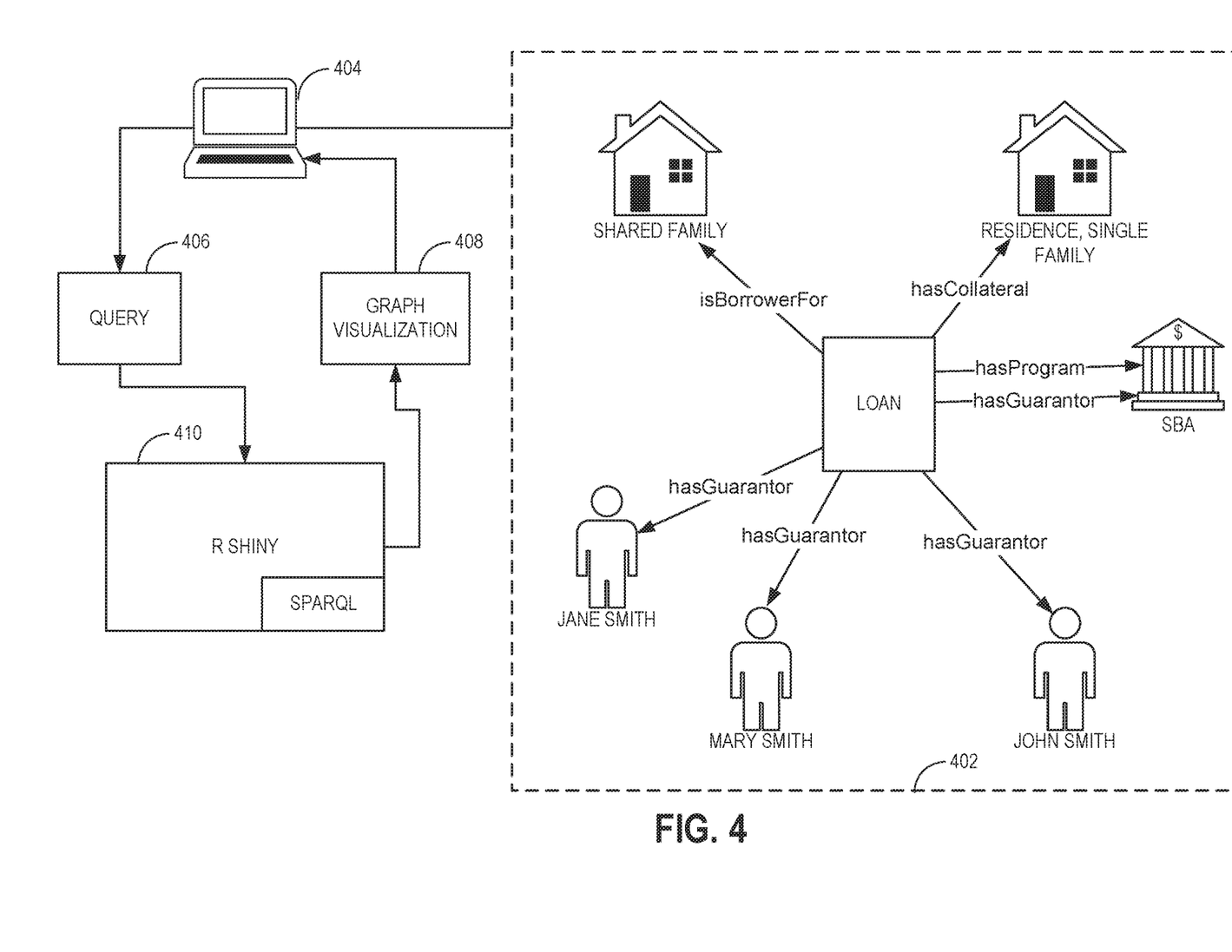
FIG. 4 illustrates a schematic of a process for presenting a knowledge graph, according to various examples.

FIG. 4 illustrates a schematic of a process for presenting a knowledge graph, according to various examples. The example process includes computing device 404, and transmitting query 406 to server 410. Server 410 may execute query 406 and format the results of the query as graph visualization 408 (e.g., data representing nodes and edges of a graph). Knowledge graph 402 may be presented on computing device 404 as a result of receiving graph visualization 408.

In knowledge graph 402, a hypothetical Smith family has a loan with guarantors of Jane Smith, Mary Smith, John Smith, and the Small Business Administration. Additionally, the loan is for a home and has a home as collateral. The information in FIG. 4 may be retrieved from a triplestore using SPARQL (a recursive acronym meaning SPARQL Protocol and RDF Query Language). Because a triplestore is a type of graph database made up of nodes and edges, various graph visualization techniques may be used without departing from the scope of this disclosure. Additionally, image files may be used for object types in an ontology and used in the visualization of knowledge graph 402 (e.g., a house for residence object).

The components of FIG. 4 may communicate over a network. The network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet.

A customer service representative (CSR) may use a process such as depicted in FIG. 4 to visualize customer data. In some examples, server 410 may present UI elements to search for defined semantic objects in a triplestore. Accordingly, the CSR may select a "Loan" object and enter in "Smith" for the query. Multiple graphs may be presented as the result of a search. For example, the search may result in multiple loans associated with different Smith families.

In other examples, natural language processing (NLP) may be used to parse query 406 into a S-P-O format for querying a triplestore. For example, a CSR may begin with entering query 406 into a website provided by server 410. Server 410 may use NLP to break the query 406 into different grammatical text elements (e.g., parts-of-speech tagging) and/or classify the text elements. Various known natural language processing techniques may be used without departing from the scope of this disclosure such as named entity recognition, n-gram analysis, k-mean clustering, hidden Markov models, Viterbi algorithm, Brill Tagger, Constraint Grammar, and the Baum-Welch algorithm, etc.

In some examples, the CSR may select an ontology for the search to help facilitate more accurate results. For example, the CSR may indicate (e.g., select from a drop-down menu) a finance ontology specific to loans should be used. In other examples, server 410 may determine an appropriate ontology (or more than one) based on a confidence level. The NLP may determine the subject of query 406 to match it to an object type in an ontology. To increase the confidence of a correct match, server 410 may look for other tagged parts-of-speech in the ontology.

Figure 5:
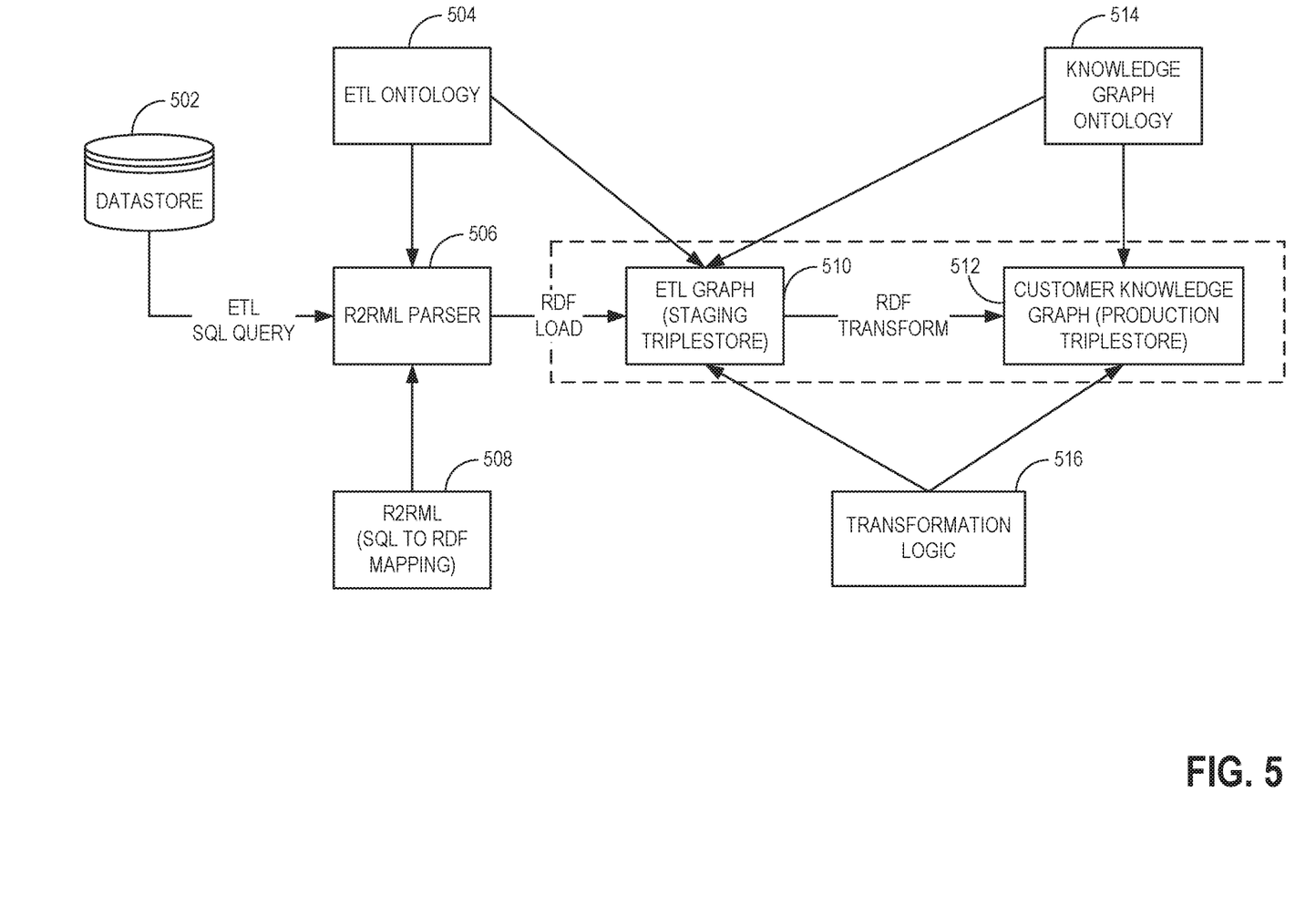
FIG. 5 illustrates a schematic of a process for translating data in a relational database into a knowledge graph, according to various examples.

FIG. 5 illustrates a schematic of a process for translating data in a relational database into a knowledge graph, according to various examples. The schematic includes relational datastore 502, Extract/Transform/Load (ETL) ontology 504, R2RML parser 506, R2RML mapping 508, ETL graph 510, customer knowledge graph 512, knowledge graph ontology 514, and transformation logic 516.

The components illustrated in FIG. 5 may be co-located or geographically disperse across one or more computing devices. The components may communicate over one or more networks (LAN, WAN, etc.). Program code for configuring a processor to perform the operations discussed with respect to FIG. 5 may be stored on a storage device. The program code may be loaded into system memory and executed by the processor to perform the operations. Performance may include the processor directing other devices (e.g., display devices, network devices) to perform functions.

A relational database (RDB) to RDF mapping proposed W3C standard exists called R2RML. One purpose of R2RML is to facilitate a map of existing relational data—as encapsulated in one or more databases—to the RDF data model. The input for an R2RML mapping is a logical table that may be a base table, a view, or a valid SQL query. The output of the R2RML is a mapping of the logical table to a RDF using a triple map. A triple map is a rule that takes each row in one of the logical tables to an RDF triple. The rule may have two components, the subject map and a multiple predicate-object map, which may be made up of predicate maps and object maps. The triple for a given database row may be formulated by combining the subject map with a predicate map and an object map.

The proposed W3C documentation provides the following, slightly modified, example. Consider a database table EMP. The EMP table includes three columns: EMPNO, ENAME, JOB. A row of the EMP table is "7639:SMITH: CLERK." A triple map may for the EMP table may be:
@prefix rr: <[website]/ns/r2rml#>.
@prefix ex: <[website]/ns#>.
<#TriplesMap1>
   rr:logicalTable [rr:tableName "EMP" ];
   rr:subjectMap [
   rr-template "[website]/employee/{EMPNO}";
   rr:class ex:Employee;
   ];
   rr:predicateObjectMap [
   rr:predicate ex:name;
   rr:objectMap [rr:column "ENAME" ];
   ].
The output of the R2RML may be
<[website]data.example.com/employee/7369>rdf:type ex:Employee.
<[website]data.example.com/employee/7369>ex:name "SMITH".

Although R2RML may generate triples from a RDB, it may not be in a form useful for a CSR because the relationships defined in a RDB may be different than those in a customer knowledge graph (CKG). As described above, R2RML would generally use column names and the values of the columns to create the triples. In other words, the resulting ontology (e.g., ETL ontology 504) and R2RML map (e.g., R2RML mapping 508) generated based on a relational database (e.g., relational datastore 502) may be based on column identifiers. As an example, if R2RML parser is used on a table such as table 304, an obligor object of "*****6145" may have an "indirect_type" of "820." A CSR may not find this useful because the CSR may not know what an "indirect type" of 820 represents. Accordingly, a transformation of the resulting R2RML triples may be used to make the triples conform to an ontology of a CKG. A more detailed description of such a process is discussed next.

Relational datastore 502 may be one or more relational databases containing one or more tables. The databases may be stored on a single storage (or computing) device or distributed across multiple devices. The data may also be federated across multiple organizations. The data stored in the databases may be stored according to a database schema.

In an example, R2RML parser 506 takes data from relational datastore 502 an input and outputs ETL graph 510 (e.g., a staging triplestore). The input data may be the result of an SQL query submitted to relational datastore 502. Other inputs to R2RML parser 506 may be R2RML mapping 508 according to the R2RML specifications described above. R2RML parser 506 may also use ETL ontology 504, which may be based on the relationship and syntax of relational datastore 502, to generate the triples for ETL graph 510.

At this point, ETL graph 510 may contain a series of triples, but triples that do not conform to knowledge graph ontology 514. Transformation logic 516 may be used to transform triples in ETL graph 510 to triples in customer knowledge graph 512 (e.g., a production triplestore). Transformation logic 516 may be scripts written according to the SPARQL protocol. The scripts may contain instructions to create new triples, modify triples, or remove duplicated triples found in ETL graph 510.

A transitive map may be used as part of the SPARQL scripts to take objects according to ETL ontology 504 to subjects according to knowledge graph ontology. Consider the 820 indirect obligor code discussed above. Transformation logic 516 may lookup code 820 in ETL ontology 504 and see that when the code 820 is used in the "indirect type" column from table 304 in relationship to "indirect_obligor" it is for a class of "Guarantor." Accordingly, a triple for a guarantor object may be generated and stored in customer knowledge graph 512. ETL ontology 504 may include definitions (e.g., extensible markup language, table entries, etc.) in a tuple format (Column, Source Table, Class, [Property]). The tuple for the above example may be [indirect_obligor, ts_guarantor_data, Guarantor (indirect_type=820),]. In an example, the transitive map data (e.g., code 820 to guarantor) is stored in the SPARQL script. Consequently, ETL ontology 504 may not need to be queried to perform an RDF transform.

Figure 6:
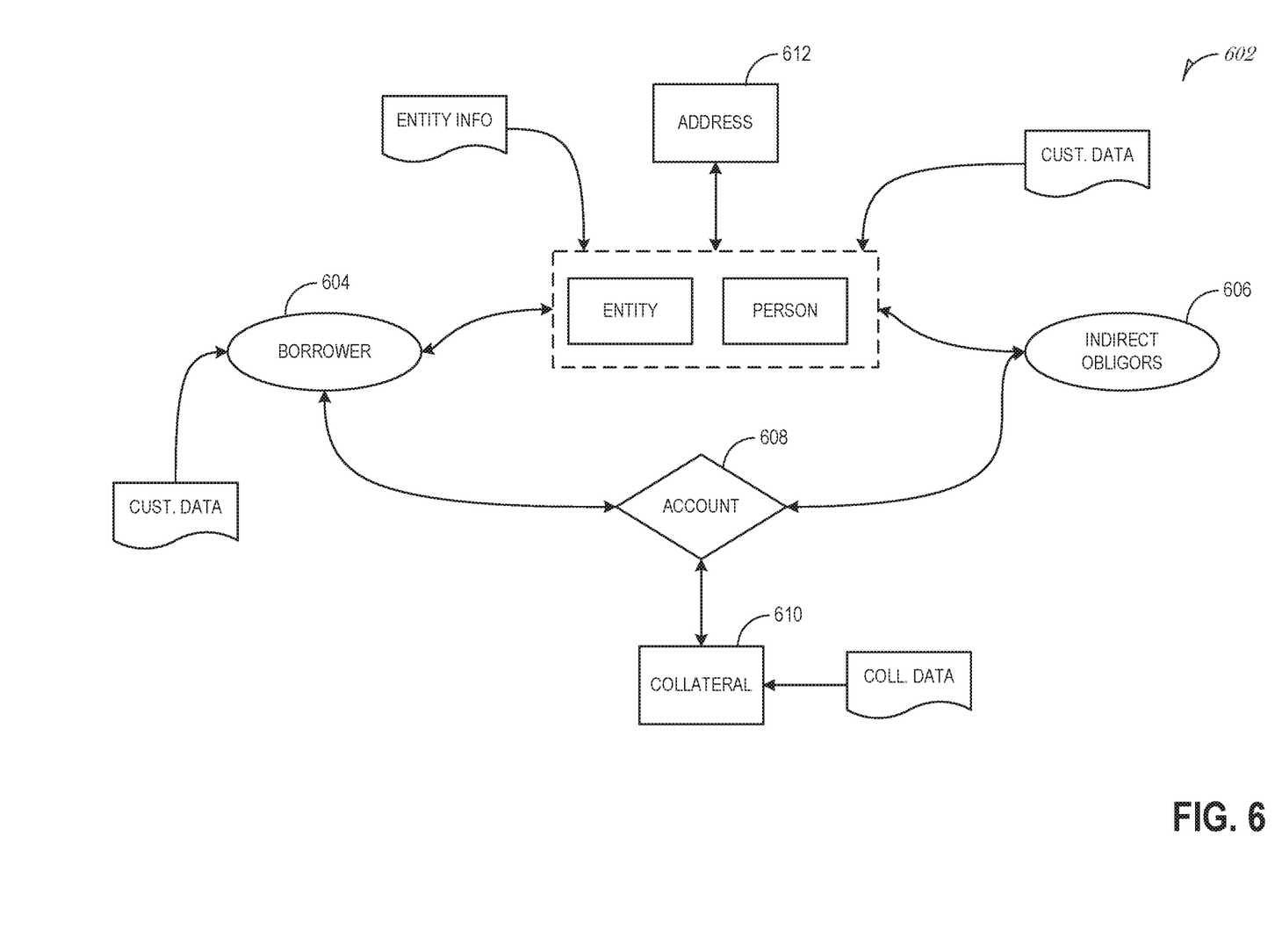
FIG. 6 illustrates a visualization of an RDF transform, according to various examples.

FIG. 6 illustrates a visualization 602 of an RDF transform, according to various examples. Visualization 602 includes semantic objects: borrower 604, indirect obligors 606, account 608, collateral 610, and address 612. The data stored in the semantic objects may ultimately be sourced from relational datastore 502, but in this instance, is most immediately sourced from triples in ETL graph 510. For example, "Cust Data" may be a triple that is the result of R2RML parser 506.

The creation of the semantic objects, and where to source the data for the objects, may be part of the SPARQL scripts. For example, a SPARQL script may first create a triple for borrower 604 after looking up an obligor type code from a triple in ETL graph 510. Next, account 608 may be created that is linked (e.g., related according to knowledge graph ontology 514) to a created indirect obligor object. After customer knowledge graph 512 has been created, ETL graph 510 may be discarded (e.g., deleted).

Figure 7:
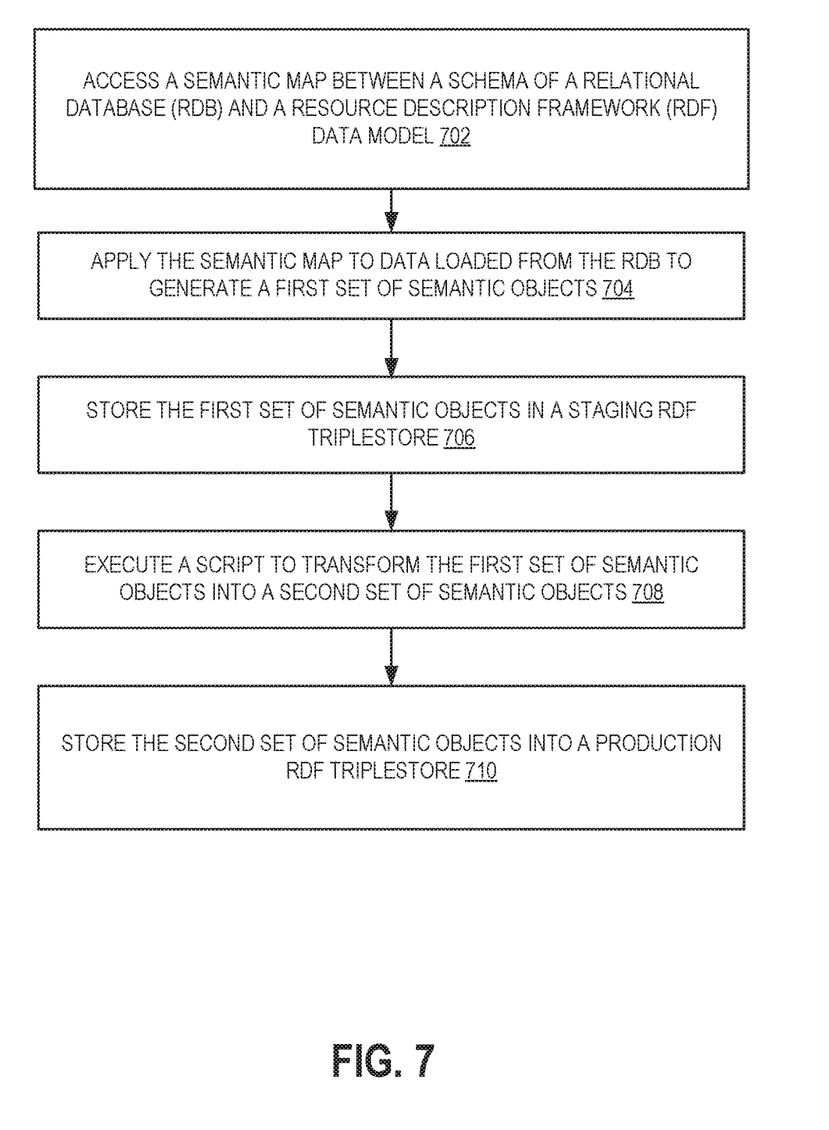

FIG. 7 illustrates a flowchart of operations for translating semantic objects between triplestores. Program code for configuring a processor to perform the operations discussed with respect to FIG. 7 may be stored on a storage device. The program code may be loaded into system memory and executed by the processor to perform the operations. Performance may include the processor directing other devices (e.g., display devices, network devices) to perform functions. The operations may be performed as part of an automated process of generating or updating a triplestore. The automated process may be run periodically (e.g., daily) to update the triplestore. The operations may be performed on a single computing device or distributed across multiple computing devices.

The operations may include accessing (e.g., retrieving from a storage device) a semantic map between a schema of a relational database (RDB) and a resource description framework (RDF) data model (operation 702). The semantic map may be defined according to a first semantic ontology. The map may be formatted in accordance with the R2RML standard. The first semantic ontology may be based on relationships and column names of a schema of a relational database. The first semantic ontology may also indicate semantic objects associated with codes found in the relational database.

The operations may further include applying the semantic map to data loaded from the RDB to generate a first set of semantic objects (operation 704) and storing the first set of semantic objects in a staging RDF triplestore (operation 706). Applying the semantic map may include executing an SQL query on the RDB.

The operations may further include executing a script to transform the first set of semantic objects into a second set of semantic objects according to a second semantic ontology (operation 708). The script may be written and executed according to the SPARQL Protocol and RDF Query Language. The second semantic ontology may be the ontology of a customer knowledge graph. The operations may further include storing the second set of semantic objects into a production RDF triplestore (operation 710).

Executing the script to transform the first set of semantic objects into the second set of semantic objects according to the second semantic ontology may include querying the staging RDF triplestore for a code associated with a semantic object of the first set of semantic objects. The code may be an object of a subject of a triple in the staging RDF triplestore. The code may be looked up in the first semantic ontology to determine a type of object linked to the code. The type of object may also be part of the second semantic ontology. Another semantic object may be generated according to the determined type. The semantic object may be based on the foreign key of a column in a table of the RDB.

The operations may also include operations to visualize the production datastore. For example, the operations may include receiving a query for the production RDF triplestore (e.g., via an API, webpage, etc.). A set of result semantic objects from the production RDF triple store may be retrieved based on the query. The set of result semantic objects may be presented (e.g., transmitting for display) in a graph format, wherein the graph labels are based on the second semantic ontology. Accordingly, data from a customer knowledge graph may be presented as a result of the query.

The presentation of the graph may include optional features such as determining that a first semantic object of the set of result semantic objects has a likelihood above a certain threshold of being the same as a second semantic object of the set of result semantic objects and presenting an identification (e.g., displaying an icon on both objects) of the first and second semantic objects as being likely the same semantic object.

Any suitable similarity algorithm may be used without departing from the scope of this invention. For example, object properties may be compared for unique properties (e.g., a residential address) and if they match, it may be determined the semantic objects represent the same object. Similarly, business records sometimes have duplicate entries due to different spellings of names (e.g., Robert vs Bob). If the object properties of two "person" entities are identical except for the name, there may be an 80% chance of the semantic object being the same. The percentage is merely illustrative, and may be higher or lower depending on the algorithm used.

Identical semantic objects may be created as part of the transformation script(s). In an example, the production RDF triplestore is traversed to find duplicate semantic objects and one or more of the duplicate semantic objects may be removed.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
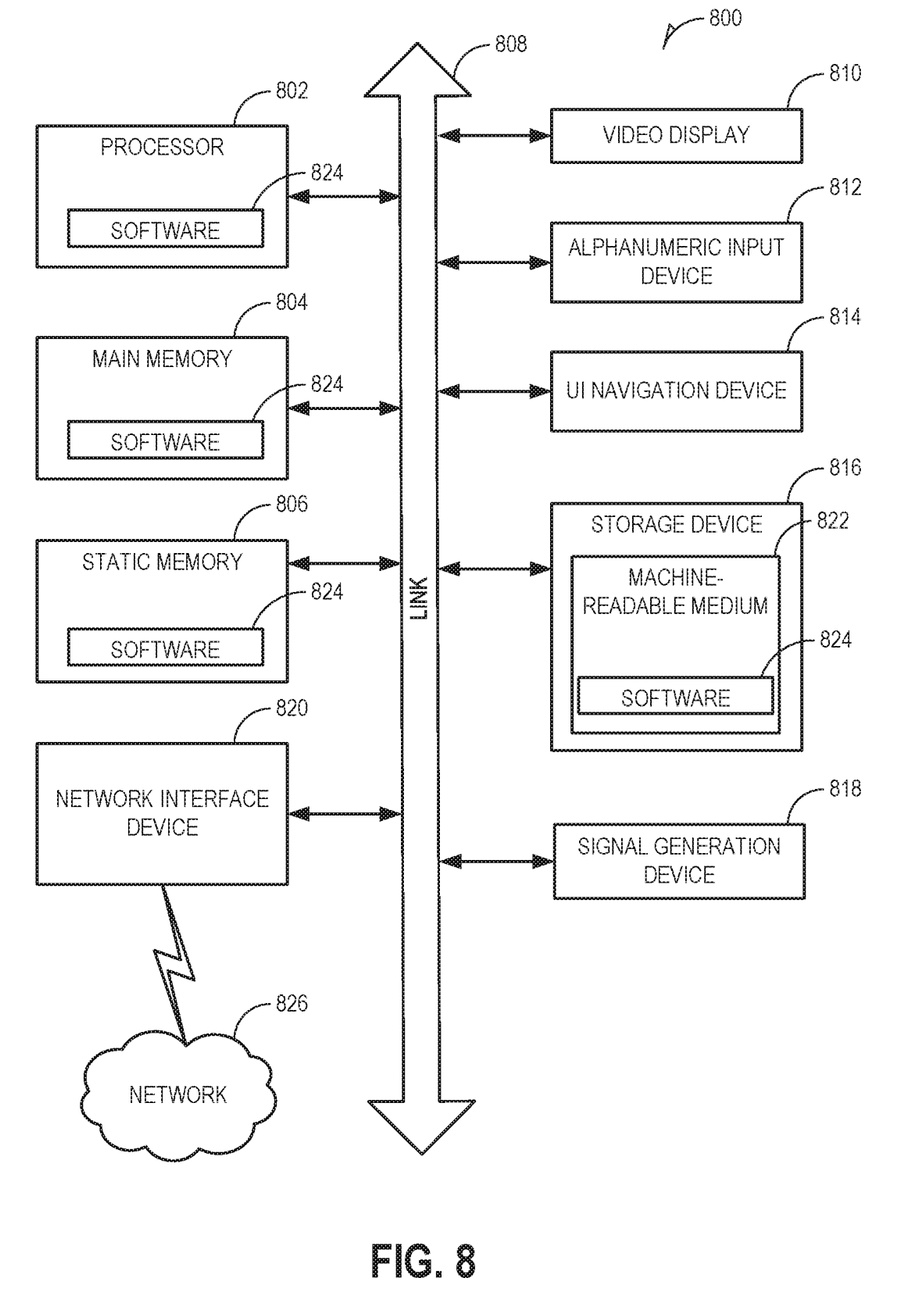
FIG. 8 is a block diagram illustrating an example machine upon which any one or more of the techniques (e.g., methodologies) discussed herein may be performed, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

The invention claimed is:

1. A method comprising:
accessing a semantic map between a schema of a relational database (RDB) and a resource description framework (RDF) data model, the semantic map defined according to a first semantic ontology, the first semantic ontology defining subjects and respective objects associated with the subjects;
applying the semantic map to data loaded from the RDB to generate a first set of semantic objects;
storing the first set of semantic objects in a staging RDF triplestore; and
executing a script to transform the first set of semantic objects into a second set of semantic objects according to a second semantic ontology, the second semantic ontology defining subjects and respective objects associated with the subjects in the second ontology, wherein executing the script includes:
accessing a transitive map in the script that identifies mappings between the objects defined in the first semantic ontology to the subjects defined in the second semantic ontology;
generating a semantic object based on a foreign key of column in a table of the RDB;
storing the second set of semantic objects into a production RDF triplestore;
querying the staging RDF triplestore for a code associated with a semantic object of the first set of semantic objects, wherein the code is an object defined in the first semantic ontology;
looking up the code in the transitive map to determine a type of object linked to the code, the type of object being defined as a subject of the second semantic ontology; and
generating another semantic object according to the type of object.

2. The method of claim 1, wherein the code is stored as the object of the semantic object.

3. The method of claim 1, further comprising:
receiving a query for the production RDF triplestore;
retrieving a set of result semantic objects from the production RDF triplestore based on the query; and
presenting the set of result semantic objects in a graph format, wherein the graph format is based on the second semantic ontology.

4. The method of claim 3, wherein presenting the set of result semantic objects in a graph format comprises:
determining that a first semantic object of the set of result semantic objects has a likelihood above a certain threshold of being the same as a second semantic object of the set of result semantic objects; and
presenting an identification of the first and second semantic objects as being likely the same semantic object.

5. The method of claim 1, further comprising:
traversing the production RDF triplestore to find duplicate semantic objects; and
removing one of duplicate semantic objects.

6. The method of claim 1, wherein the script is formatted according to SPARQL Protocol and RDF Query Language.

7. A non-transitory computer-readable medium comprising instructions, which when executed by at least one processor, configure the at least one processor to perform operations, the operations comprising:
accessing a semantic map between a schema of a relational database (RDB) and a resource description framework (RDF) data model, the semantic map defined according to a first semantic ontology, the first semantic ontology defining subjects and respective objects associated with the subjects;
applying the semantic map to data loaded from the RDB to generate a first set of semantic objects;
storing the first set of semantic objects in a staging RDF triplestore; and
executing a script to transform the first set of semantic objects into a second set of semantic objects according to a second semantic ontology, the second semantic ontology defining subjects and respective objects associated with the subjects in the second ontology, wherein executing the script includes:
accessing a transitive map in the script that identifies mappings between the objects defined in the first semantic ontology to the subjects defined in the second semantic ontology;
generating a semantic object based on a foreign key of column in a table of the RDB;
storing the second set of semantic objects into a production RDF triplestore;
querying the staging RDF triplestore for a code associated with a semantic object of the first set of semantic objects, wherein the code is an object defined in the first semantic ontology;
looking up the code in the transitive map to determine a type of object linked to the code, the type of object being defined as a subject of the second semantic ontology; and
generating another semantic object according to the type of object.

8. The non-transitory computer-readable medium of claim 7, wherein the code is stored as the object of the semantic object.

9. The non-transitory computer-readable medium of claim 7, the operations further comprising:
receiving a query for the production RDF triplestore;
retrieving a set of result semantic objects from the production RDF triplestore based on the query; and
presenting the set of result semantic objects in a graph format, wherein the graph format is based on the second semantic ontology.

10. The non-transitory computer-readable medium of claim 9, wherein the operation of presenting the set of result semantic objects in a graph format comprises:
determining that a first semantic object of the set of result semantic objects has a likelihood above a certain threshold of being the same as a second semantic object of the set of result semantic objects; and
presenting an identification of the first and second semantic objects as being likely the same semantic object.

11. The non-transitory computer-readable medium of claim 7, the operations further comprising:
traversing the production RDF triplestore to find duplicate semantic objects; and
removing one of duplicate semantic objects.

12. The non-transitory computer-readable medium of claim 7, wherein the script is formatted according to SPARQL Protocol and RDF Query Language.

13. A system comprising:
at least one processor;
a storage device comprising instructions, which when executed by the at least one processor, configure the at least one processor to perform operations, the operations comprising:
accessing a semantic map between a schema of a relational database (RDB) and a resource description framework (RDF) data model, the semantic map defined according to a first semantic ontology, the first semantic ontology defining subjects and respective objects associated with the subjects;
applying the semantic map to data loaded from the RDB to generate a first set of semantic objects;
storing the first set of semantic objects in a staging RDF triplestore; and
executing a script to transform the first set of semantic objects into a second set of semantic objects according to a second semantic ontology, the second semantic ontology defining subjects and respective objects associated with the subjects in the second ontology, wherein executing the script includes:

accessing a transitive map in the script that identifies mappings between objects in the first semantic ontology to subjects in the second semantic ontology;

generating a semantic object based on a foreign key of column in a table of the RDB;

storing the second set of semantic objects into a production RDF triplestore;

querying the staging RDF triplestore for a code associated with a semantic object of the first set of semantic objects, wherein the code is an object defined in the first semantic ontology:

looking up the code in the transitive map to determine a type of object linked to the code, the type of object being defined as a subject of the second semantic ontology; and generating another semantic object according to the type of object.

14. The system of claim 13, wherein the code is stored as the object of the semantic object.

* * * * *

UNITED STATES PATENT AND TRADEMARK OFFICE
CERTIFICATE OF CORRECTION

PATENT NO. : 11,238,084 B1
APPLICATION NO. : 15/645574
DATED : February 1, 2022
INVENTOR(S) : Newman et al.

It is certified that error appears in the above-identified patent and that said Letters Patent is hereby corrected as shown below:

On the Title Page

On page 2, in Column 2, item (56) under "Other Publications", Line 15, delete "15/471,723," and insert --15/471,728,-- therefor In the Claims In Column 13, Line 12, in Claim 13, delete "ontology:" and insert --ontology;-- therefor Signed and Sealed this
Seventh Day of June, 2022

Katherine Kelly Vidal
*Director of the United States Patent and Trademark Office*